United States Patent [19]

Greene et al.

[11] Patent Number: 4,554,345

[45] Date of Patent: Nov. 19, 1985

[54] PREPARATION OF LIQUID POLYAMIDE FROM DINITRILE AND DIAMINE

[75] Inventors: Janice L. Greene, Chagrin Falls; Roman Loza, Solon, both of Ohio

[73] Assignee: The Standard Oil Company, Cleveland, Ohio

[21] Appl. No.: 490,284

[22] Filed: May 2, 1983

Related U.S. Application Data

[63] Continuation-in-part of Ser. No. 250,797, Apr. 3, 1981, Pat. No. 4,380,623.

[51] Int. Cl.$^4$ ............................................. C08G 69/00
[52] U.S. Cl. .................................... 528/336; 528/335; 564/124; 564/132; 564/154

[58] Field of Search ................ 528/336, 335; 564/124, 564/132, 154

[56] References Cited

PUBLICATIONS

Hackh's Chemical Dictionary, Fourth Edition, pp. 27, 62.

*Primary Examiner*—Harold D. Anderson
*Attorney, Agent, or Firm*—David P. Yusko; John E. Miller, Jr.; Larry W. Evans

[57] ABSTRACT

This invention describes a process for preparing liquid polyamides comprising contacting a nitrile, amine and water in the presence of a carbon dioxide catalyst.

6 Claims, No Drawings

PREPARATION OF LIQUID POLYAMIDE FROM DINITRILE AND DIAMINE

This application is a continuation-in-part of U.S. Ser. No. 250,797 which was filed on Apr. 3, 1981, now U.S. Pat. No. 4,380,623.

BACKGROUND OF THE INVENTION

This invention relates to a process for preparing liquid polyamides from nitriles, water and amines. In one embodiment, this invention relates to the preparation of polyamides from dinitriles, diamines and water.

There are several known methods for producing polyamides by contacting nitriles, amines and water. At an early date in the development of nylons, it was proposed that linear polyamides be made by heating a reaction mixture comprising a dinitrile, a diamine and water. This process is disclosed in Greenwalt, U.S. Pat. No. 2,245,129. The procedure disclosed in the Greenwalt patent is carried out in two stages, the first stage comprising the heating of the reaction mixture in a closed reaction vessel until a low molecular weight polyamide is formed, and the second stage comprising subsequent heating of the precursor or prepolymer that is produced to form a higher molecular weight polyamide. Later patents, such as U.S. Pat. No. 3,847,876 provide for an improved process for preparing high molecular weight polyamides by contacting a dinitrile, a diamine and water. This patent teaches that an improved process results from conducting this reaction in the presence of ammonia in three stages.

The invention described herein discloses a simple process which can be conducted in one or two stages to produce an amide from a nitrile, an amine and water. The key to the instant process is the discovery that carbon dioxide will act as a catalyst to increase the yield and selectivity of the product. Moreover, when the nitrile is a dinitrile and the amine is a diamine, a high quality polyamide having good molecular weight can be prepared.

SUMMARY OF THE INVENTION

It has now been discovered that an amide can be prepared by contacting an amine, a nitrile and water in the presence of a carbon dioxide catalyst. Moreover, it has been discovered that a solid or liquid polyamide can be prepared by contacting a diamine, a dinitrile and water in the presence of a carbon dioxide catalyst.

In an alternate embodiment of this invention, an amidine can be prepared by contacting an amine with a nitrile in the presence of a carbon dioxide catalyst.

In the preferred embodiment of this invention, adiponitrile, hexamethylene diamine and water are contacted in the presence of carbon dioxide to produce nylon-6,6.

DETAILED DESCRIPTION

The invention described herein relates to a process for preparing amides from nitriles, amines and water. It is believed that this process proceeds on the following basis:

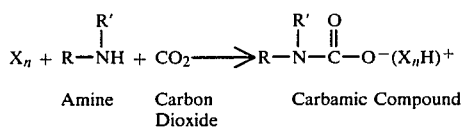

Amine — Carbon Dioxide — Carbamic Compound

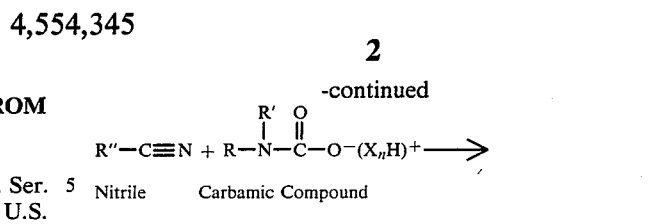

Nitrile — Carbamic Compound

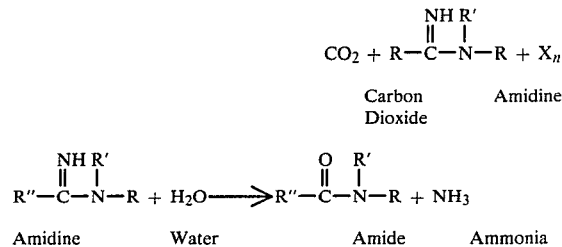

Carbon Dioxide — Amidine

Amidine — Water — Amide — Ammonia wherein the carbamic compound can be either an acid or a salt and each R, R' amd R'' is a suitable substituent as defined in the following paragraphs. When $n=0$, X is not included in the reaction; when $n=1$, X is an amine including ammonia. If the amine is a diamine and the nitrile is a dinitrile, then a polyamide, i.e. nylon, is produced.

The amines useful in this process include ammonia and those amines containing from 1 through 20 carbon atoms. These amines are preferably aliphatic compounds and they may be described by the following formula:

wherein each R is a independently selected from the group consisting of hydrogen and a $C_1$ through $C_{18}$ alkyl and R' is a $C_1$ through $C_1$ alkyl or alkylene group.

In one embodiment of the invention, these amines are diamines containing from 0 through 20 carbon atoms. These diamines are preferably aliphatic and can be represented by the following formula:

$$H_2N-R'_{(m)}-NH_2$$

wherein R' is an alkyl or alkylene group containing from 1 to 18 carbon atoms and m can be 0 or 1. More preferably, these diamines contain at least 4 carbon atoms.

Examples of suitable amines include hexamethylene diamine, n-butylamine, isobutyl amine, 1,10-diaminodecane, 1,4-diaminobutane, 1,5-diaminopentane and 1,8-diaminooctane.

The nitriles useful in the invention process include those nitriles which contain from 2 through 20 carbon atoms. The preferred nitriles can be represented by the formula:

wherein R'' is an alkyl alkylene or aryl radical having from 1 through 17 carbon atoms.

More preferably, these nitriles contain from 2 through 12 carbon atoms.

In one embodiment of the invention, the nitrile is a dinitrile containing from 2 through 18 carbon atoms. These dinitriles may be aliphatic or aromatic or they may contain a hetero-atom. The preferred dinitriles can be generally described by the formula:

$$N\equiv C-R''-C\equiv N$$

wherein R" is an alkyl, alkylene or aryl radical having from 1 through 17 carbon atoms.

Examples of nitriles which can be used in this invention include succinonitrile, glutaronitrile, adiponitrile, acrylonitrile, 1,4-dicyanobutene-2, 1,4-dicyanocyclohexane, 1,4-dicyanobenzene, trans-1,2-dicyanocyclobutane, phthalonitrile, terephthalonitrile, p-phenylene diacetonitrile, m-phenylene diacetonitrile, 3,3'-[1,4-butanediylbis(oxy)] bispropanenitrile, 3,3'-oxybispropanenitrile and 3,3'-[(1-methylethylidene)bis(oxy)]-bispropanenitrile.

The molar ratio of the nitrile to the amine is not critical to the reaction unless the nitrile is a dinitrile and the amine is a diamine. When the reactants comprise the diamine and the dinitrile, an excess of either will act as a chain terminator and limit the molecular weight of the resultant polyamide. Generally, in this situation, it is preferred to keep this molar ratio of the nitrile to the amine between about 0.9:1 to about 1.1:1.

The catalysts useful in the process described herein comprise carbon dioxide. The carbon dioxide can be supplied in any form, e.g. gaseous, liquid or solid. Preferably, the carbon dioxide is supplied in the gaseous form. The amine, nitrile and catalyst can be added sequentially to each other in any order or they may be added simultaneously.

In the preferred practice of the invention, this process is conducted at a temperature between 75° and 350° C., more preferably 150° to 275° C. The temperature is closely related to the time required for the reaction. At low temperatures, it will take longer for the products to form than at high temperatures.

It is essential to contact the catalyst with the nitrile and amine. Although this contact can be performed at atmospheric pressure, e.g. by bubbling $CO_2$ through the nitrile and amine, it is preferred to perform this reaction under pressure. This pressure can be maintained with $CO_2$ or some combination of $CO_2$ with a gaseous reactant or a gas inert to the reaction.

The process described above may be carried out in the presence of various solvents, if desired. Solvents which may be used in the process of this invention include, for example, aromatic hydrocarbons, halogenated aromatic hydrocarbons, ethers, and the like, such as benzene, toluene, chlorobenzene, xylene, o-dichlorobenzene, etc.

As shown in the above reaction scheme, the amine, nitrile and catalyst react to form an amidine. This amidine can then be hydrolyzed to an amide. About one mole of water per mole of nitrile is necessary for this hydrolysis. If a dinitrile is used, then two moles of water per mole of dinitrile is necessary. The amide can be formed in one step by adding the water initially to the catalyst, amine and nitrile or it can proceed in two steps by adding water after the amidine has formed. It is preferable to have a slight molar excess of water.

The monomeric amides produced herein are useful as intermediates in a wide variety of reactions. The liquid polymeric amides are suitable for further polymerization with a wide variety of monomers, oligomers and polymers. The solid polymeric amides generally may be used in any application calling for a nylon-type polymer. For example, these polymers can be used as fibers, plastics, films and molding compounds. Due to their strong basic characteristics, the amidines prepared by the process of this invention are useful for a wide variety of applications. For example, they can be employed in small amounts to neutralize or render basic solutions employed in dyeing of fibers in fabrics. Furthermore, it is known that certain species of the substituted amidines have medical applications.

From a commercial standpoint, the possibility of producing high quality fiber grade nylons from diamines and dinitriles is of significance because dinitriles can be readily prepared from mononitriles, e.g. by reductive dimerization procedures, such as described in Holland, et al., U.S. Pat. No. 3,496,216 and the diamine can be easily produced from the dinitrile in conventional manner by well known reduction, e.g. hydrogenation procedures. For example, adiponitrile can be directly produced from acrylonitrile by reductive dimerization and hexamethyleme diamine can be directly produced by hydrogenating adiponitrile. Although, as indicated above, the process of the invention is applicable to a wide variety of diamines and dinitriles, it is of especial value in the production of nylon-6,6 from adiponitrile and hexamethylene diamine.

SPECIFIC EMBODIMENTS

The following examples will further illustrate this invention.

Example 1

A 1 liter stainless steel Parr autoclave, equipped with a gas inlet, a stirrer and a glass liner, was charged with a mixture containing 100 g (2.4 moles) of acetonitrile, 90 g (1.2 moles) of isobutylamine and 22 g (1.2 moles) of water. The autoclave was sealed and flushed several times with nitrogen. The stirrer was turned on and the autoclave was pressurized with gaseous carbon dioxide to 80 psig. The autoclave was then heated to 160° to 182° C., under autogeneous pressure, for 18 hours. The autoclave was then depressurized, cooled, opened and 107.4 g of a liquid were recovered. This liquid was analyzed by IR and NMR spectroscopy. The major component was identified as N-isobutylacetamide.

Example 2

A mixture containing 90 g (1.2 moles) of n-butylamine and 100 g (2.4 moles) of acetonitrile was charged to the autoclave described in Example 1. The autoclave was sealed and flushed several times with nitrogen. The stirrer was turned on and the autoclave was pressurized with carbon dioxide to 90 psig. The autoclave was then heated to 190° to 193° C. for 15.5 hours under autogeneous pressure. The autoclave was cooled, depressurized, opened and a small sample was withdrawn. Analysis of this sample by IR spectroscopy showed the presence of an amidine. To the remaining crude liquid was added 22 g (1.2 moles) of water. The autoclave was resealed and flushed several times with nitrogen and then pressurized to 100 psig. The autoclave was heated at 174° to 193° C. for 16.5 hours under autogeneous pressure. The autoclave was then cooled, depressurized and opened and a small sample was withdrawn. The major component of this sample was identified by IR spectroscopy as N-butylacetamide.

Example 3

A 600 ml stainless steel Parr autoclave, equipped with a gas inlet, a stirrer and a glass liner, was charged with a mixture containing 32.4 g (0.30 moles) of adiponitrile, 34.8 g (0.30 moles) of hexamethylene diamine and 54. g (0.30 moles) of water. The autoclave was sealed and flushed several times with nitrogen and finally pressurized to 100 psig with carbon dioxide. The stirrer was turned on and the pressure began to drop as the temperature rose. When the pressure reached 20 psig, the autoclave was repressurized to 100 psig with carbon dioxide. The procedure was repeated until no more carbon dioxide had been absorbed. At this point, the vessel was pressurized to 240 psig with carbon dioxide. The autoclave was placed inside an electrically heated jacket. The mixture was then heated at 191° C. for 19 hours at autogeneous pressure. After cooling, the autoclave was depressurized, opened and 69.9 g of a solid was recovered. This solid was found to have a melting point of 185° to 200° C. A 20 g sample was ground up and stirred with boiling water for 1 hour. The insoluble material was filtered, washed with methanol and dried overnight at 50° C. in a vacuum. The dried water insoluble material (10.4 g) melted at 200° to 215° C. and had an intrinsic viscosity of 0.09 dl/g. (90 percent formic acid). Analysis of this material by IR/NMR spectroscopy confirmed the presence of a polyamide.

Example 4

The procedure was Example 3 was repeated except that 12.0 g (0.67 moles) of water was used. After cooling, the autoclave was depressurized, opened and 72.6 g of a white solid was recovered. A 20 g sample of this solid was ground up and stirred with boiling water for 1 hour. The insoluble material was filtered, washed with methanol and dried overnight at 50° C. in a vacuum. The dried, water insoluble material (15.8 g) melted at 235° to 240° C. and had an intrinsic viscosity of 0.12 dl/g (90 percent formic acid). Analysis of this material by IR/NMR spectroscopy confirmed the presence of a polyamide.

Example 5

The procedure of Example 4 was repeated except that the autoclave was pressurized to 60 psig with nitrogen and then to 160 psig with carbon dioxide. The stirrer was turned on and the temperature rose to 72° C. and the pressure dropped to 70 psig over a 5 minute interval. The autoclave was then heated at 192° to 196° C. for 21 hours under an initial nitrogen pressure of 260 psig. After cooling the autoclave was depressurized, opened and 55.1 g of a gray solid were recovered. A 20 g sample of this solid was ground up and stirred with boiling water for 1 hour. The insoluble material was filtered, washed with methanol and dried overnight at 50° C. in a vacuum. The dried water insoluble material (15.2 g) melted at 220° to 230° C. Analysis of this material by IR/NMR spectroscopy confirmed the presence of a polyamide.

Example 6

The procedure of Example 4 was repeated except that the autoclave was pressurized to 100 psig with nitrogen and then to 200 psig with carbon dioxide. The stirrer was turned on and the temperature rose to 69° C. and the pressure dropped to 130 psig over a 2 minute interval. The autoclave was then heated at 240° to 250° C. for 16 hours under autogeneous pressure. The vessel was depressurized, cooled, opened and 58.9 g of a gray solid were recovered. A 20 g sample of this solid was ground up and stirred with boiling water for 1 hour. The insoluble material was filtered, washed with methanol and dried overnight at 50° C. in a vacuum. The dried water insoluble material (19.0 g) had a melting point of 250° to 255° C. Analysis of this material by IR/NMR spectroscopy confirmed the presence of a polyamide.

Example 7

A mixture of 3,3'-[1,4-butanediylbis(oxy)] bispropanenitrile (2.0 g), hexamethylene diamine (1.2 g) and water (1.5 g) were placed inside a 45 ml stainless steel mini autoclave. The autoclave was flushed with carbon dioxide 3 times and pressurized to 100 psig. The autoclave was then placed in an oven and heated to 205° C. for 65 hours. The autoclave was depressurized, cooled and opened and a yellow oil was recovered. IR spectroscopy confirmed the presence of a copolyamide in this yellow oil.

Example 8

The procedure of Example 7 was repeated for a mixture of 3,3'-[1,4-butanediylbis(oxy)]bispropanenitrile (2.0 g), 1,8-octanediamine (1.4 g) and water (1.5 g). Once again a yellow oil was obtained and IR spectroscopy confirmed the presence of a copolyamide in this yellow oil.

Example 9

The procedure of Example 7 was repeated for a mixture of 3,3'-oxybispropanenitrile (1.2 g), hexamethylene diamine (1.2 g) and water (1.5 g). A yellow oil was obtained.

Example 10

The procedure of Example 7 was repeated for a mixture of 3,3'-[(1-methylethylidene)bis(oxy)]bispropanenitrile (1.2 g, 1,8-octanediamine (1.4 g) and water (0.8 g). A yellow oil was obtained.

Example 11

The procedure of Example 7 was repeated for a mixture of 3,3'-[(1-methylethylidene)bis(oxy)]bispropanenitrile (1.2 g), hexamethylene diamine (1.2 g) and water (1.5 g). A yellow oil was obtained.

Although only a few embodiments of this invention have been specifically described above, it should be appreciated that many additions and modifications can be made without departing from the spirit and scope of the invention. These and all other modifications are intended to be included within the scobe of this invention, which is to be limited only by the followihg claims.

We claim:

1. A process for preparing a liquid polyamide comprising contacting a diamine with water and a dinitrile in the presence of carbon dioxide.

2. The process of claim 1, where the diamine is represented by the following formula:

$$H_2-(R')_n-NH_2$$

wherein R' is a radical containing from 1 to 18 carbon atoms and n is 0 or 1.

3. The process of claim 2 wherein the diamine is selected from the group consisting of hexamethylene diamine, 1,10-diaminodecane, 1,4-diaminobutane, 1,5-diaminopentane and 1,8-diaminooctane.

4. The process of claim 3 wherein the diamine is hexamethylene diamine.

5. The process of claim 1, where the dinitrile is represented by the formula:

$$N\equiv C-R''-C\equiv N$$

wherein R″ is a divalent radical containing from 1 to 17 carbon atoms.

6. The process of claim 1, wherein the dinitrile is selected from the group consisting of 3,3′-[1,4-butanediylbis(oxy)] bispropanenitrile, 3,3′-oxybispropanenitrile and 3,3′-[(1-methylethylidene)bis(oxy)] bispropanenitrile.

* * * * *